US006810339B2

(12) United States Patent
Wills

(10) Patent No.: US 6,810,339 B2
(45) Date of Patent: Oct. 26, 2004

(54) ANTI-ISLANDING METHOD AND APPARATUS FOR DISTRIBUTED POWER GENERATION

(75) Inventor: Robert H. Wills, Wilton, NH (US)

(73) Assignee: Plug Power, Inc., Latham, NY (US)

( * ) Notice: Subject to any disclaimer, the term of this patent is extended or adjusted under 35 U.S.C. 154(b) by 0 days.

(21) Appl. No.: 09/811,342

(22) Filed: Mar. 16, 2001

(65) Prior Publication Data

US 2001/0056330 A1 Dec. 27, 2001

Related U.S. Application Data

(63) Continuation of application No. 09/198,919, filed on Nov. 24, 1998, now Pat. No. 6,219,623.
(60) Provisional application No. 60/066,460, filed on Nov. 24, 1997.

(51) Int. Cl.[7] ............................. H02J 1/00; G01R 27/00
(52) U.S. Cl. ......................................... 702/65; 700/297
(58) Field of Search ..................... 702/60, 65; 700/286, 700/292, 297, 298; 361/60; 307/31, 125, 127, 129, 130

(56) References Cited

U.S. PATENT DOCUMENTS

| | | | |
|---|---|---|---|
| 4,404,472 A | | 9/1983 | Steigerwald |
| 4,419,619 A | * | 12/1983 | Jindrick et al. ............. 323/256 |
| 4,445,049 A | | 4/1984 | Steigerwald |
| 4,630,220 A | * | 12/1986 | Peckinpaugh ................ 700/298 |
| 4,695,737 A | * | 9/1987 | Rabon et al. .................. 307/31 |
| 4,788,619 A | | 11/1988 | Ott et al. |
| 4,819,121 A | | 4/1989 | Saito et al. |
| 4,819,180 A | * | 4/1989 | Hedman et al. ............. 700/291 |
| 4,878,208 A | | 10/1989 | Seki et al. |
| 4,994,684 A | | 2/1991 | Lawn et al. |
| 5,111,377 A | | 5/1992 | Higasa et al. |
| 5,162,964 A | | 11/1992 | Higasa et al. |

(List continued on next page.)

FOREIGN PATENT DOCUMENTS

| | | |
|---|---|---|
| EP | 0677911 | 10/1995 |
| EP | 0810713 A2 | 12/1997 |

OTHER PUBLICATIONS

Ghali, Fadia M.A., A Combined Technique for Elimination of Islanding Phenomenon, Electronic Research Institute, 25th PVSsC; May 13–17, 1996, 1473–1476.

Haeberlin et al., Islanding of Grid–connected PV Inverters; Test Circuits and Test Results, IES–PVPS–Task V, Workshop about Gid Interconnection of Photovoltaic Power Systems, Sep. 15, 1997, 8 pages, Zurich.

Kitamura et al., Islanding Phenomenon Elimination Study at Rokko Test center, WCPEC, Dec. 5–9, 1994, 759–762.

Kobayashi et al., Method for Preventing Islanding Phenomenon on Utility Grid with a Number of Small Scale PV Systems, IEEE PVS, Oct. 22, 1991, 5 pages.

Stevens, Utility Intertied Photovoltaic System Islanding Experiments, Proceedings of the Nineteenth IEEE Photovoltaic Specialists Conference, May 4, 1987, 1134–1138.

*Primary Examiner*—Marc S. Hoff
*Assistant Examiner*—Paul L Kim
(74) *Attorney, Agent, or Firm*—Fish & Richardson P.C.

(57) ABSTRACT

The invention in the simplest form is a method and apparatus for reliably protecting against island situations with one or multiple power sources connected to an electric distribution grid. The method and apparatus detects variations in the voltage and frequency of the grid. An observed change in grid voltage causes a change in output power that is sufficient to cause an even larger change in grid voltage when the utility AC power source is disconnected. An observed change in grid frequency causes a change in phase or reactive output power that is sufficient to cause an even larger change in grid frequency. If several shifts in voltage or frequency happen in the same direction, the response to the change is increased in an accelerating manner.

30 Claims, 5 Drawing Sheets

U.S. PATENT DOCUMENTS

| | | |
|---|---|---|
| 5,239,251 A | 8/1993 | Lawn |
| 5,369,353 A | 11/1994 | Erdman |
| 5,485,393 A | 1/1996 | Bradford |
| 5,493,485 A | 2/1996 | Okado |
| 5,677,833 A | 10/1997 | Bingley |
| 5,686,766 A | 11/1997 | Tamechika |
| 5,754,253 A * | 5/1998 | Lee .............................. 348/565 |
| 6,172,889 B1 * | 1/2001 | Eguchi et al. ................ 363/95 |
| 6,219,623 B1 * | 4/2001 | Willis ........................... 702/60 |

* cited by examiner

ANTI-ISLANDING METHOD AND APPARATUS FOR DISTRIBUTED POWER GENERATION

CROSS REFERENCE TO RELATED APPLICATIONS

This application is a continuation of U.S. Pat. application Ser. No. 09/198,919 filed Nov. 24, 1998, now U.S. Pat. 6,219,623, and claims priority to U.S. provisional patent application No. 60/066,460 filed on Nov. 24, 1997.

BACKGROUND OF THE INVENTION

1. Field of the Invention

The present invention relates to anti-islanding inverters, power converters and generators connected to electric distribution utility grids.

2. Background Art

The distribution of electric power from utility companies to households and businesses utilizes a network of utility lines connected to each residence and business. This network or grid is interconnected with various generating stations and substations that supply power to the various loads and that monitor the lines for problems.

An electric utility grid generally can also consist of many independent energy sources energizing the grid and providing power to the loads on the grid. This distributed power generation is becoming more common throughout the world as alternative energy sources are being used for the generation of electric power. In the United States, the deregulation of electric companies has spurred the development of independent energy sources co-existing with the electric utility. Rather than have completely independent energy sources for a particular load, these alternative energy sources can tie into the grid and are used to supplement the capacity of the electric utility.

The number and types of independent energy sources is growing rapidly, and can include photovoltaics, wind, hydro, fuel cells, storage systems such as battery, super-conducting, flywheel, and capacitor types, and mechanical means including conventional and variable speed diesel engines, Stirling engines, gas turbines, and micro-turbines. In many cases these energy sources can sell the utility company excess power from their source that is utilized on their grid.

Each of these independent energy sources needs some type of power converter that feeds energy to the grid to power the various loads and also needs to provide protection when the grid becomes unstable. The utility company is still the main power source and in many cases controls the independent source to some degree. Safety concerns arise when the utility source is disconnected from the independent sources, leaving the independent source directly tied to a load or disjointed grid branch. There are various passive and active means that can be used to disconnect the independent energy sources from the grid once the utility connection is lost.

Utility companies are concerned that power converters used for distributed electric power generation (e.g. converting power from photovoltaics, micro-turbines, or fuel cells at customer sites) may continue to generate and feed the grid, or part of a grid, even if the utility connection to the grid is disabled. This condition is known as islanding or "run-on".

Islanding is more generally defined as the continued operation of a grid-coupled power converter, generator or independent power source in general, in cases where the utility grid has been switched off, cut-off, or the distribution lines have been damaged, so that no electric energy is delivered from the utility side. The electric utility industry has long recognized the need for eliminating islanding conditions on electric utility grids.

There are many hazards associated with islanding to human life, property, and equipment. These concerns are based on a fear that power quality (i.e. voltage, frequency or harmonic content) might go outside acceptable bounds, or that a line service person working on a line thought to be dead could be harmed from a backfeed from the distributed generator, or that their lack of control of an island may make reconnecting the system and resolving the problem difficult or impossible. A section of the grid that is disconnected from the utility may be undergoing maintenance or repair. If there is an energy source connected to the grid, utility personnel can be injured directly or indirectly from an electrical shock.

There is also a hazard to load equipment that could be damaged by unstable grid voltage or frequency once the utility is disconnected. The distributed generating equipment itself can be damaged due to fluctuations in the power which may be also a safety hazard to the property and persons nearby such equipment.

Power converters such as inverters are necessary in modern power systems as new energy generating devices such as photovoltaics, micro-turbines, fuel cells, superconducting storage, etc., ail generate DC electricity which needs to be converted to AC for feeding into the power grid. DC-AC inverters generally behave as a current source that injects a controlled AC sinewave current into the utility line. The controlled AC current is generated in sync with the observed utility zero crossings, and may be exactly in phase, generating at unity power factor where upon real power only is exported. It is also possible to generate a variable amount out of phase; at other than unit power factor where upon real and reactive power is exported to the grid. An effective change in reactive power output can be made by either generating reactive power, by phase shifting the output current waveform with respect to voltage, or by creating an assymetric distortion to the output current waveform.

Inverters that perform this DC-AC conversion function are known as "Utility-Interactive Inverters" and are the subject of several US and international codes and standards, e.g., the National Electric Code, Article 690—Photovoltaic Systems, UL 1741, Standard for Photovoltaic Inverters, IEEE 929—Recommended Practice for Utility Interface of Photovoltaic (PV) Systems.

This invention applies not only to DC-AC inverters, but also to many other methods of conversion to AC electric power where interconnection with a power grid is involved. Examples are: static inverters, and rotary converters (DC-AC motor-generator sets) which convert DC electricity to AC electricity; cycloconverters and AC to AC motor generator sets, which convert AC electricity to AC electricity; and mechanical generators which convert mechanical energy to AC electrical energy. The general term "power converter" or "converter" is used herein to indicate such devices.

There are many schemes that have been proposed to eliminate the islanding problem. The simplest use "passive methods" such as under and overvoltage, and under and over frequency shutdown trips of the converter equipment if the voltage or frequency exceed certain predefined limits. For example, proposed limits under IEEE P929 are +/−0.5 Hz from nominal for frequency and approximately +10/−14% from nominal for voltage.

More complex schemes use "unstable frequency" or "active frequency drift", where the converter frequency control circuit is made unstable so that an island condition will tend to drift up or down in frequency, ultimately creating an under or over frequency shutdown.

Other schemes involve changing the real or reactive power output of the converter to create a change in converter terminal voltage, and in most cases, an under or over frequency voltage shutdown.

Studies have found that although these methods work in most circumstance, these currently-used schemes still have a non-detect zone, where the power source will continue to supply the grid even after the utility source has been disconnected.

For example, one implementation discloses using a slide-mode frequency shift method, whereby the phase of the converter's output current is made to be a function of frequency. The converter's voltage-current phase relationship increases or decreases faster than the load's, making the 60 Hz equilibrium point an unstable point. The slide-mode frequency shift method has a non-detection zone when feeding high-Q utility circuits such as may occur on lightly loaded feeders with power factor correction capacitors as a resonant RLC parallel circuit formed by the load, transformer magnetizing inductances and the power factor correcting capacitors respectively. Q is the "quality factor" of the resonant circuit and is defined as:

$$2\pi FL/R$$

where F is the utility and resonant frequency, L is the circuit inductance and R is the load resistance. Islanding has been observed in lab experiments with Q values as low as 2.0. Such values are possible in real world utility distribution circuits.

Another implementation discloses changing reactive power based on the rate of change of frequency. This technique differs from these herein disclosed as the present invention uses a measure of change in frequency, rather than rate of change of frequency which is the first derivative of same.

Another problem that has not been fully addressed is that of multiple converters on an electric power grid. For example, if the unstable frequency method is used, and one manufacturer chooses a tendency to drift up in frequency, and another, a tendency to drift down in frequency, their efforts may balance and the island will remain, undefeated.

In order to reduce the aforementioned problems, attempts have been made to produce reliable anti-islanding converters. Generally, these have been effective under most conditions. However, theoretical analysis has shown that all have a considerable non-detection zone that, to this point, has yet to be satisfactorily addressed. Utility companies are requiring certain shutdown in case of loss of grid power, so any non detection zone is unacceptable. A non-detection zone is an area of operation with specific loads that is capable of sustained islanding. This is typically a range around the resonance and real and reactive power match points of an RLC load circuit.

One such invention is described in U.S. Pat. No. 5,493,485 discloses an inverter device that incorporates a detection circuit and a correction circuit that generates a corrective signal to disconnect the source from the grid upon detecting the utility source has been disconnected. The correction circuit relies on an initial reference signal.

U.S. Pat. No. 5,162, 964 uses frequency thresholds for under frequency and over frequency conditions. The pre-determined or set thresholds will disconnect the source from the grid only when the threshold is crossed.

These two patents use simple over and under voltage and over and under frequency limits which have been shown to be inadequate to fully protect against islanding.

The inverter device of U.S. Pat. No. 4,878,208 initially measures the AC output signal and compares present phase response to the initial measurement. If the present phase is outside a pre-determined range, the unit disconnects the source from the grid. This is a widely used and effective technique that is integral in most inverter designs as if phase-lock is lost, abnormally large currents may be drawn. Such a phase shift will occur if a non-unity power factor load and power converter are suddenly disconnected from the grid.

European Patent EP 810713 uses a distortion source to cause a variation in the output frequency upon detecting an islanding condition. The distortion encompasses forms of feedback loops and pulse width modulation variation. Applying distortion to the converter output waveform will not necessarily result in reliable island detection as the voltage response of the islanded load is dependent upon its impedance. A very high impedance at the distortion frequency, or the additional distortion caused by a non-linear load could defeat this scheme.

There are several inverter products available that have reduced the islanding problem, including the Ascension Technology SunSine300 and the Advanced Energy Systems MI-250. The Advanced Energy Systems (AES) product uses an active unstable frequency shifting technique that increases frequency once the utility is disconnected, eventually causing an over-frequency trip in most cases. The direction of frequency drift is settable in software. However, studies of the current product offering indicated that none of the units were adequate to prevent islanding within tolerable limits.

For example, an AES inverter when connected to a worst-case load (a test required by one major US utility) consisting of an induction motor with flywheel loading, plus compensating capacitors to bring the power factor to unity, and some parallel load resistance was found to island indefinitely.

What is needed is an anti-islanding scheme that can effectively and reliably eliminate islanding conditions in all likely distributed generation situations. This scheme should be flexible in usage, widely applicable, cost-effective to manufacture and capable of integration into all types of existing and future converter systems.

SUMMARY OF THE INVENTION

The present invention has been made in consideration of the aforementioned background. It is therefore an object of the present invention to provide an anti-islanding converter that eliminates islanding conditions to within acceptable parameters. This invention relates to the problem of ensuring that distributed power generation equipment (equipment that is designed to feed power into the power grid) will de-energize when the connection to the main utility power source is lost.

An object of the present invention is to provide a converter that detects a change of frequency, up or down, and causes an accelerated frequency shift in the same direction to quickly trip an under/over frequency limit.

Another object of the invention is where the frequency acceleration function is linear, geometric, exponential, or another increasing function so that disturbances on the grid are minimal except during islanding conditions, whereupon the system becomes unstable and quickly trips off.

Another object of the present invention is to provide an converter that detects a change of voltage, up or down, and causes an accelerated voltage shift in the same direction to quickly trip an under/over voltage limit.

Another object of the invention is where the voltage acceleration function is linear, geometric, exponential, or other increasing function so that disturbances on the grid are minimal except during islanding conditions, whereupon the system becomes unstable and quickly trips off.

A further object of the invention is to incorporate both frequency and voltage positive feedback methods into a single converter.

A further object of the invention is to incorporate accelerated response in either the frequency feedback loop or the voltage feedback loop or both loops.

An additional object of the invention is to provide a scheme for power limited sources such that the output power is reduced upon a voltage shift either up or down.

Yet another object of the invention is where the acceleration function is used on both real and reactive power.

Yet a further object of the invention is to provide an anti-islanding converter for multiple converters and multiple power sources.

A further object of the invention is provide for reactive power feedback or changing the phase of the output current.

Yet an even further object of the invention is provide for real power feedback.

And yet a further object of the invention is to provide a converter where the method can be applied either continuously or intermittently.

An additional object of the invention is for a converter capable of observing its output voltage, phase or frequency, and of changing its real or reactive power, or frequency reference, to reinforce the observed change.

Other objects, features and advantages are apparent from the descriptions presented in conjunction with the accompanying drawings.

DESCRIPTION OF THE PREFERRED EMBODIMENT

Figure 1:
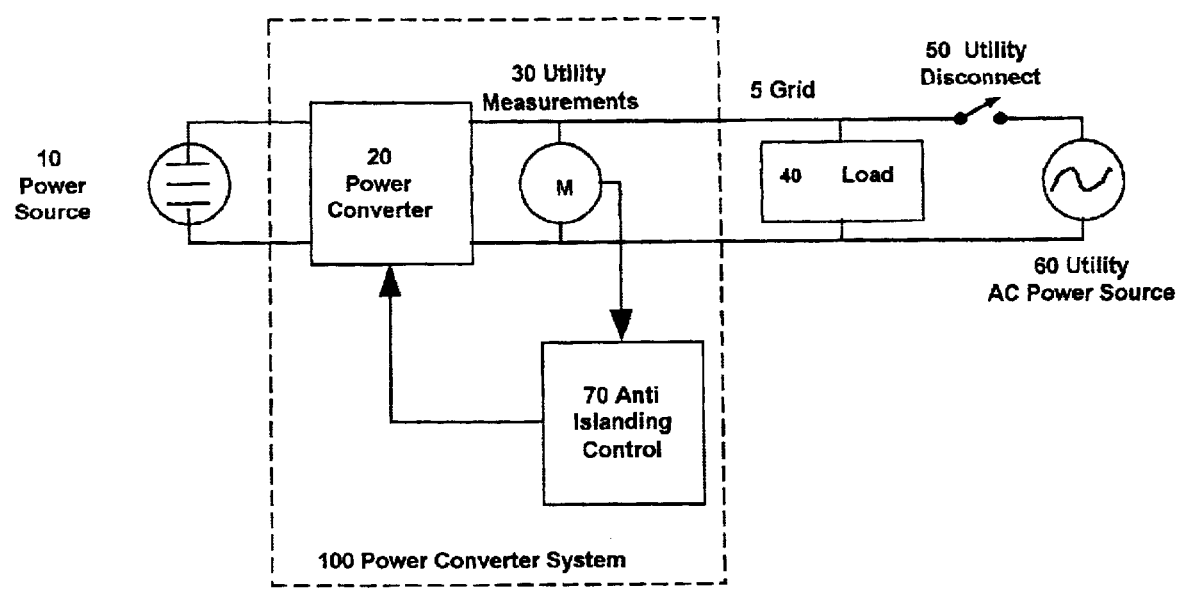
FIG. 1 is a basic block diagram illustrating the interconnection of a power converter with the grid.

FIG. 1 is a simplified block diagram of the present invention connected to a power grid 5. The power source 10, which can be AC electrical, DC electrical or mechanical (including hydraulic), is connected to the converter 20. The independent power source 10 can be from photovoltaic, wind, hydro, fuel cell, storage systems (such as battery, super-conducting flywheel, and capacitor types) and mechanical means including conventional and variable speed diesels, Stirling engines, gas turbines, and micro-turbines. There can be any number of independent power sources 10 and converters 20 attached to the grid 5.

The converter 20 is connected to a utility measurement circuit 30, for measuring necessary parameters such as voltage, phase, frequency and current. The measurement circuit 30 is connected to, or the information is transmitted to, the anti-islanding control unit 70. This control unit 70 is tied to the converter 20. In most applications, a single device (the power conversion system 100) encompasses the converter 20, the utility measurement circuit 30, and the anti-islanding control unit 70.

The power source 10 may be in the form of DC electricity, AC electricity, rectified AC electricity, or mechanical energy such as in the form of a rotating shaft from an engine DC electrical sources include photovoltaics, fuel cells, and the rectified output of the AC generator of a wind turbines, flywheels, variable speed diesel gensets or micro-gas turbines. AC electrical sources include wind turbines, flywheels, variable speed diesel gensets and micro-gas turbine AC generators. Mechanical sources include various types of engine including turbines, spark-ignition, diesel, and Stirling, and also hydraulic sources such as wind and water turbines, and hydraulic pump/motor combinations.

The converter 20, also called an inverter or generator, accepts electrical or mechanical energy from the power source 10. The power converter 20 may be a solid-state inverter, an electromechanical rotary converter (also called a motor-generator set), an AC power controller such as a bi-directional motor drive or cyclo-converter, a hydraulic converter, or an electro-mechanical generator set that is driven by a heat engine or mechanical energy converter.

The utility measurements section 30 monitors the grid for voltage, frequency, phase, and current levels. In certain applications it is unnecessary to measure all the parameters, and only the necessary measurement data is measured. The measurement data is transmitted to the anti-islanding control circuit 70 which processes the data and calculates an appropriate response. The inverter responds to the control unit 70 and alters the power source 10 that is connected to the grid 5.

The anti-islanding control system 70 controls the behavior of the converter 20 in such a way as to ensure that islanding does not occur. The anti-islanding control system 70 may be embodied in either analog electronic circuits, digital electronic circuits (where the algorithms are implemented by sampling utility voltage and frequency values and responding to them appropriately), in software, or by mechanical means such as with some form of a governor, or an acoustical device.

The load 40 represents the residential and business consumers of electricity connected to the isolated section of the grid. The load 40 is the normal utility load at one or several sites. For example, at a residence, it may be a mix of lighting, appliances and heating. The load requirements are satisfied by the utility power source 60 and also by the power sources 10.

The utility power source 60 may be a national power grid, a single generator as in a remote village or a plurality of generators as in a power station with several gensets feeding a mini-grid. The utility power source 60 is the primary controller of the grid and generates the power source at the proper frequency and voltage levels for that grid. The standards for frequency, phase, voltage and current can vary, and the utility-power source is responsible for maintaining consistent and dependable power. The grid, power converter system and load can be single phase, split phase, three phase or polyphase systems.

The utility can become disconnected from the grid 50, either intentionally in order to provide service or repair, or unintentionally such as from fallen power lines. Regardless of the reason, the independent source 10 will still be tied to the islanded part of the grid and will be supplying power to the load 40. Disconnect device 50 may be a switch, fuse or circuit breaker, or as is often the case, a broken distribution wire. The disconnection device can be anything that isolates the power converters and loads from the main source of utility generation.

An islanding situation is most likely to occur when the power output of the converter 20 closely matches the load 40. If this match occurs, disconnecting the utility source 60 can lead to sustained operation of the converter 20 because the voltage and frequency of the system can remain within normal bounds. The anti-islanding control unit 70 of the present invention prevents this hazardous occurrence.

The anti-islanding control system 70 can operate either continuously, at discrete time intervals, or intermittently.

While the utility source 60 is connected, the load 40 voltage is maintained by the utility. If the converter 20 changes its real power, or reactive power output, it simply changes the flow from converter to utility. However, if the utility source 50 is disconnected forming an island consisting of the converter and the load, several scenarios are possible.

If the converter happens to be providing exactly the power requirements of the load, both real and reactive, then the island will continue as the load voltage and phase will not change.

If a real power shift occurs at the load, then the load voltage will change according to Ohms law:

Change in load voltage=change in load current×load impedance
($V=I*Z$)

This change in load voltage may cause an under or over voltage trip, however voltage trips are generally set at +/−10%, so the converter current must shift by at least this amount to cause a trip. This amount of shift will generally cause an unacceptable amount of flicker even when the utility generator is connected, and therefore is not particularly practical.

Figure 2:
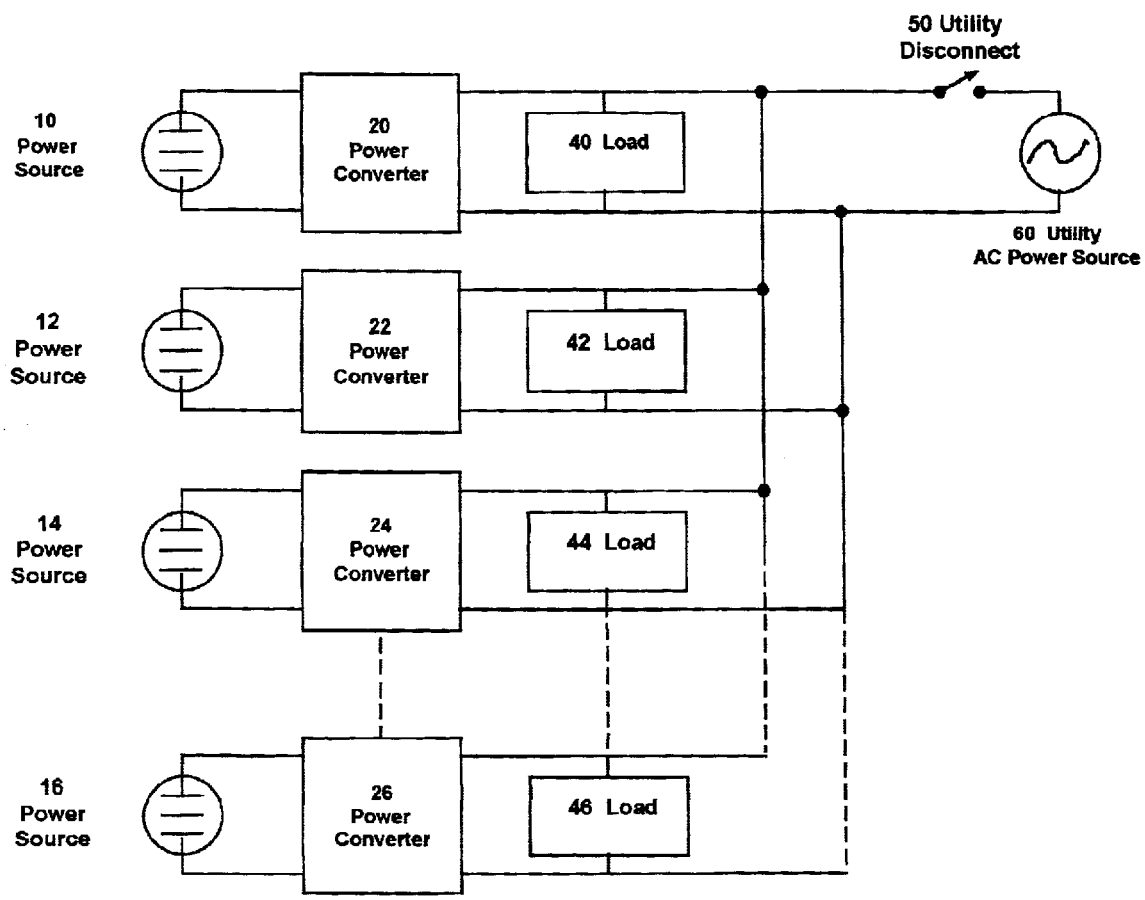
FIG. 2 is a block diagram depicting multiple power converters.

A more general embodiment of the invention is shown in FIG. 2, where multiple power sources (10, 12, 14, 16) and multiple converters (20, 22, 24, 26) are connected in parallel to the grid having multiple loads (40, 42, 44, 46). Multiple power sources (10, 12, 14, 16) feed multiple power converters (20, 22, 24, 26). "Multiple" in this case means two or more units, and could conceivably be used with thousands or even millions of converters, all interconnected to a power grid 5.

Multiple converters that use simple anti-islanding schemes can lead to serious islanding problems. Any variations in one converter's output in an attempt to detect an island must be synchronized with all of the others, else the loads will respond to the average change, which will tend to zero as the number of converters on the sub-grid increases. If converter 20 has an active frequency drift in the upward direction, and converter 22 has active frequency drift in the downward direction, their efforts could balance and a sustained island could occur. The present invention eliminates such islands in multiple converters.

One embodiment of the present invention to create a uniform direction for frequency shifting is a "group movement approach". There are various reasons to choose a frequency shift, either up or down, and the international community has yet to achieve unanimous consensus because there are advantages and disadvantages to choosing a single standard. An upward frequency shift may cause less waveform distortion. A downward frequency shift for rotating motor loads would tend to spin down when the utility disconnects, whereas an upward shift follows any mechanical induction generators that may be on-line.

The "group movement approach" is to choose a direction based what is observed to be happening on the grid at any particular time. For instance, if a 0.01 Hz frequency shift is observed going down, then all converters shift to downward active frequency shifting. This approach can works well as frequency is a broadcast parameter of the power system that is available to all generators (i.e., converters) simultaneously, and so they can move, as a group, all in the same direction. In most situations where the utility control frequency is disconnected, the present invention will accelerate the shutdown process and disconnect the power source from the grid.

By voltage, we mean either the rms, peak, average or other equivalent measure of the AC voltage waveform. By phase, we mean the period of the AC waveform half-cycles, translated into degrees based on a nominal utility frequency, and by frequency, we mean the observed zero crossing frequency of the voltage waveform. In split and polyphase systems, voltage and frequency measurements may be made individually on each phase leg.

This anti-islanding scheme may also use an increasing response to a repeated change in either utility voltage, phase or frequency to reinforce the observed change.

The present invention allows for an active frequency shift that describes an increasing (linear, exponential, geometric, a combination, or other)positive feedback response to an observed utility frequency shift.

The present invention also allows for an active power output shift that describes an increasing (linear, exponential, geometric, a combination, or other)positive feedback response to an observed utility voltage shift. For example, if the AC rms line voltage is observed to increase, then the converter control circuit performs a slight increase in real power output. If the line voltage decreases, the converter decreases the real output power.

A variation of these embodiments uses an increasing response (linear, exponential, geometric, a combination, or other positive feedback response) to the voltage or frequency movement. For example, if a small shift in grid voltage is observed, a small corresponding output power shift is generated. If a further shift in voltage is observed, in the same direction, then the corresponding power output shift increment is increased to accelerate the process. This results in a more stable system under normal conditions as the normal power changes are quite small—they only get large when the "group" of converters all starts moving in the same direction.

We call these repeated changes in voltage or frequency in the same direction a "trend". The method may accelerate either voltage, frequency or both feedback responses upon detecting a trend. Threshold levels may be used in determining trends to minimize unwanted output variation.

The response of the power converter to a change in grid voltage or frequency must be sufficient to cause an unstable state even before an accelerating response is initiated. This means that the minimum feedback response must create a larger change than was observed. For example, if we assume that the load matches the converter output, then a 1% change in observed grid voltage would require slightly more than a 1% change in converter output to assure instability. The same requirement applies to frequency and reactive power shifts.

Many Utility-Interactive converters are only capable of real power output-the output current is always in phase with the line voltage. Some converters, however, are capable of fully phase controlling their output current, and thus injecting reactive, as well as real, power into the distribution system. Even converters designed for only real power output can have an asymmetry or shift applied to their output waveform which has the same effect as a change in reactive power output.

The ability to shift reactive power creates another set of possible anti-islanding schemes. If a reactive power shift occurs on the load output, then the load voltage will again change according to Ohms law:

Change in load voltage=change in load current×load impedance ($V=I*Z$)

But now, the converter current is not in phase with the load voltage, and so in addition to a voltage shift, a phase shift in the load voltage occurs.

In the single converter case, a reactive power shift causes a change in phase according to:

Change in Phase=Arctan (delta $Iq/Ir$), where delta Iq is the change in the reactive component of the converter output current, and Ir is the real component of the converter output current (i.e., Converter output current):

$I=Ir+j Iq$, where j is the square root of (−1).

The converter can be provided with a phase trip that shuts the converter down if the observed line zero-crossing phase shifts by some amount (typically 5 degrees) from the regular 180 degree per half-cycle normal pattern. A 5 degree trip would require approximately a $5/180=2.2\%$ shift in reactive power.

Changing the reactive power output of the converter works well for the single converter case, but again, in the multiple converter case, the effect of any one converter will average out unless there is some form of synchronization between converters. The "group movement" approach can again be used. If any converter capable of reactive power control or waveform shifting or similar means observes a change in phase or frequency, it must respond with a reactive power shift that will reinforce this phase or frequency change. If repeated phase or frequency changes are seen in the same direction, the response to the phase change should increase, either a linear, exponential or other response. Again, this minimizes the impact of the scheme under normal conditions, but creates a positive feedback that accelerates the response in a true island situation. This reinforcement can be very small-small enough so as not to cause a power quality problem on a normal utility line. If repeated movements in the converter output voltage, phase or frequency occur in the same direction (i.e., a trend occurs), the converter response is increased (via a linear, exponential, geometric, combined or other increasing function), to increase the effect and speed of the response.

For example, a voltage decrease of 1.0 Volts is observed on a 120V nominal grid system (i.e. 0.83%). The converter output is reduced by slightly more than this amount—say 1%. The result of this, in a power-matched island case would be a further voltage reduction of 1.2 Volts. At this point, an accelerating response function can be invoked as two changes in the same direction were observed. One such function could be exponential doubling. The converter's response would then be twice the previous gain, times two, or 2.4%. The observed grid voltage change, acceleration factor and response after various time steps are shown in the following table:

| Time Step | Grid Voltage Change | Response | Acceleration | Output |
| --- | --- | --- | --- | --- |
| 1 | −0.83% | −1.00% | 1 | −1.00% |
| 2 | −1.00% | −1.20% | 2 | −2.40% |
| 3 | −2.40% | −2.88% | 4 | −11.52% |
| 4 | −11.52% | −13.82% | 8 | −110.59% |

The third step would push the island voltage to beyond a pre-defined 10% under voltage trip (for example) and the converter would shut down. The fourth step would reduce the converter output to zero.

The "repeated changes in the same direction" or "trends" that invoke accelerating functions may be simply two same-direction events following each other, or two time samples that show the same trend. They may also include averaging or sampling means for instance, three or more changes in the same direction may be needed to invoke acceleration, or any other suitable function could be used to control the accelerating response. Typically, the accelerating response function would be implemented in software based on repeated time samples of the grid voltage and frequency.

Figure 3:
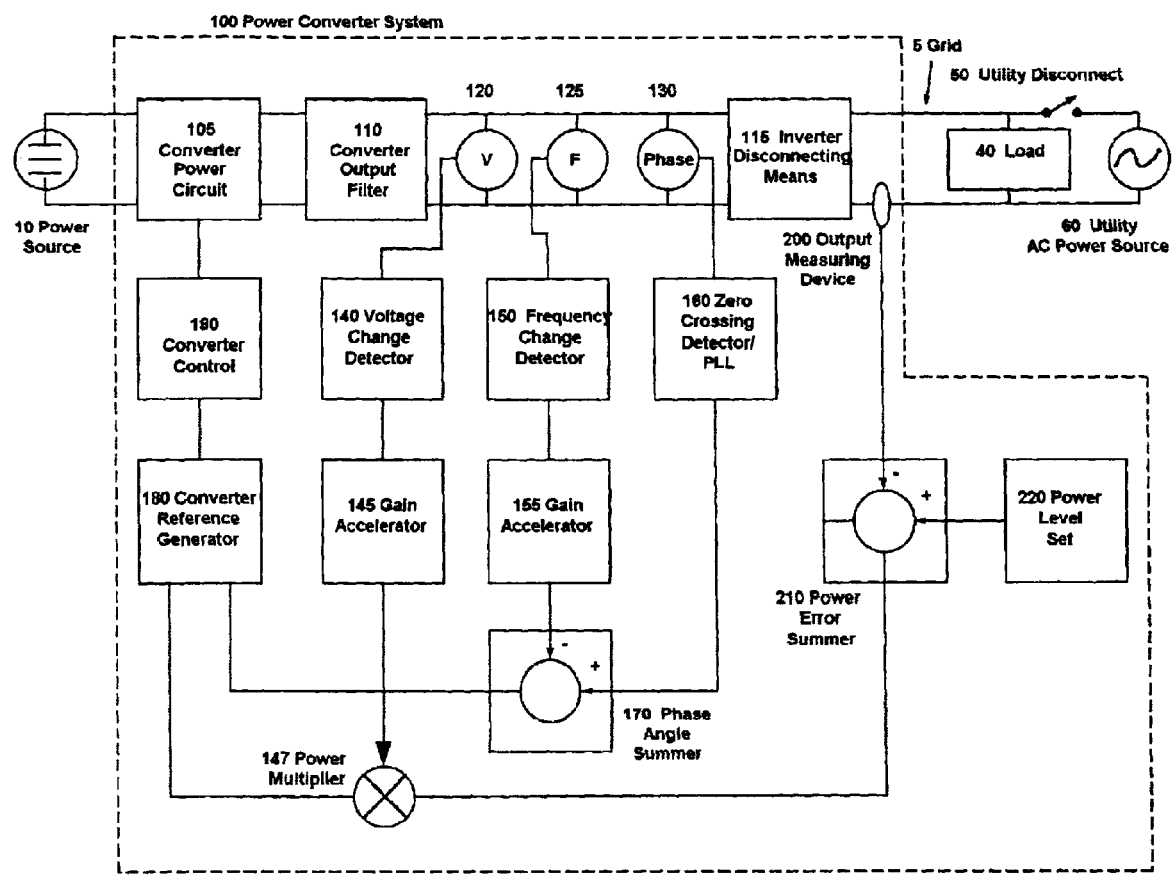
FIG. 3 is a block diagram illustrating a static inverter/converter embodiment.

In FIG. 3, one embodiment of the invention is depicted in relation to a static converter, or other converter, 100. In this embodiment, energy from an AC, rectified AC or DC electrical power source 10 is converted to utility-line synchronous AC power and fed into the power grid 5. The converter power circuit 105 may be a DC-AC inverter, a rectifier plus an inverter, or an AC power and/or frequency controller such as an AC motor drive or cyclo-converter. The converter output is often fed through an output filter 110 to limit the current injected into the power grid 5 to fundamental 50 or 60 Hz AC current.

The converter may have a disconnecting means 115 which may be in the form of a switch, solid state switch, relay or contactor. This disconnecting means is used to disconnect the power source 10 from the grid 5 under certain circumstances such as when the utility power source 60 is disconnected from the grid—i.e. an island occurs.

A converter typically monitors output voltage, frequency and phase for compliance with normal operation. A voltage measuring unit 120, a frequency measuring unit 125, and a phase measuring unit 130 can be implemented either in analog, digital, software or mechanical means. For a split or polyphase system, multiple measuring units may be used (one per phase leg).

The voltage signal from the voltage measuring unit 120 is fed to a voltage change detector 140. This device or circuit detects a change in grid line voltage between the immediate value and either a past value or a function of past values such as a moving average, or a reference value.

Similarly, the frequency signal from the frequency measuring unit 125 is fed to a frequency change detector 150. This device or circuit detects a change in grid line frequency between the immediate value and either a past value or a function of past values such as a moving average, or a reference value. The voltage change detector 140 and frequency change detectors 150 may be implemented in analog, digital or mechanical means but are most easily implemented in software. For split or polyphase systems, multiple detectors may be used.

The voltage and frequency change signals are fed to gain accelerator circuits 145 and 155, that increase in their response if repeated changes in voltage or frequency, in the same direction, are measured The acceleration can be linear, exponential, geometric, a combination or any arbitrary function. The acceleration functions may be implemented in analog, digital or mechanical means but again are most easily implemented in software. The voltage gain accelerator 145 is further connected to a power multiplier 147.

The phase signal from the phase measuring unit 130 is fed to a zero crossing detector/PLL 160. The zero crossing detector 160 typically performs two functions. First, it provides the starting time reference for the converter reference generator 180. Second, it detects any large step in phase which may indicate a loss of utility power with a non-unity power factor load. The zero crossing detector 160 may be implemented as an analog or digital phase locked loop that averages zero crossing position and reduces the likelihood of noise causing false trips or erratic operation. The phase angle summer 170 combines the frequency signal component from the frequency gain accelerator 155 and the zero crossing detector/PLL 160.

The waveform of the converter power circuit 105 is generated by a reference circuit 190 which is typically a sinewave so as to match the utility waveform.

In normal operation, the amplitude of the converter reference 180 and hence the converter output is controlled by a feedback circuit comprising an output measuring device 200, a power level setting 220 and a power level error summer 210 which control the converter reference generator 180. In split or polyphase systems individual feedback loops can operate on each phase.

In an islanding situation, the line voltage is measured by the voltage measuring unit 120. The voltage change detector 140 indicates the direction and amount of the voltage change. The gain accelerator 145 calculates the appropriate acceleration voltage value. The output of the gain accelerator 145 feeds a multiplier circuit or means 147 which multiples the accelerated voltage value and changes the converter reference generator 180 output and thus the converter output power in such a way as to increase the voltage change in the same direction as the measured change.

If the power source 10 is limited in power output and is operating at its maximum power output, then the alternate scheme of reducing power output upon either an increase or a decrease in line voltage is used until the source falls below its maximum power limit. For example, a photovoltaic power source is physically limited in power output dependent upon how much sunlight is falling on its surface. It the power converter is adjusted to extract the maximum power available from the photovoltaic source and a grid voltage increase is observed, then increasing power output in the way otherwise proposed is not possible. This alternate scheme relies on the fact that, in a multiple converter system, most converters will be operating at the maximum power point and so most will reduce output power. In an island situation, this will reduce grid voltage which then the group-movement will pick up and the system will trip out on undervoltage.

In an islanding situation, the line frequency is measured by the frequency measuring unit 125. The frequency change detector 150 determines the directions and amount of change. The gain accelerator 155 calculates the appropriate frequency acceleration value. The output of the gain accelerator 155 feeds a summing circuit or means 170 which changes the reference generator 180 phase, and thus the converter output phase. This changes the converter reactive power output in such a way as to increase the frequency change.

The phase angle summer 170 and power multiplier 147 may be implemented in analog, digital, mechanical, or software means. The observed change in grid voltage causing a change in output power feedback loop, and the observed change in grid frequency causing a change in phase or reactive output power feedback loop, together with accelerating responses are novel features of the present invention.

Figure 4:
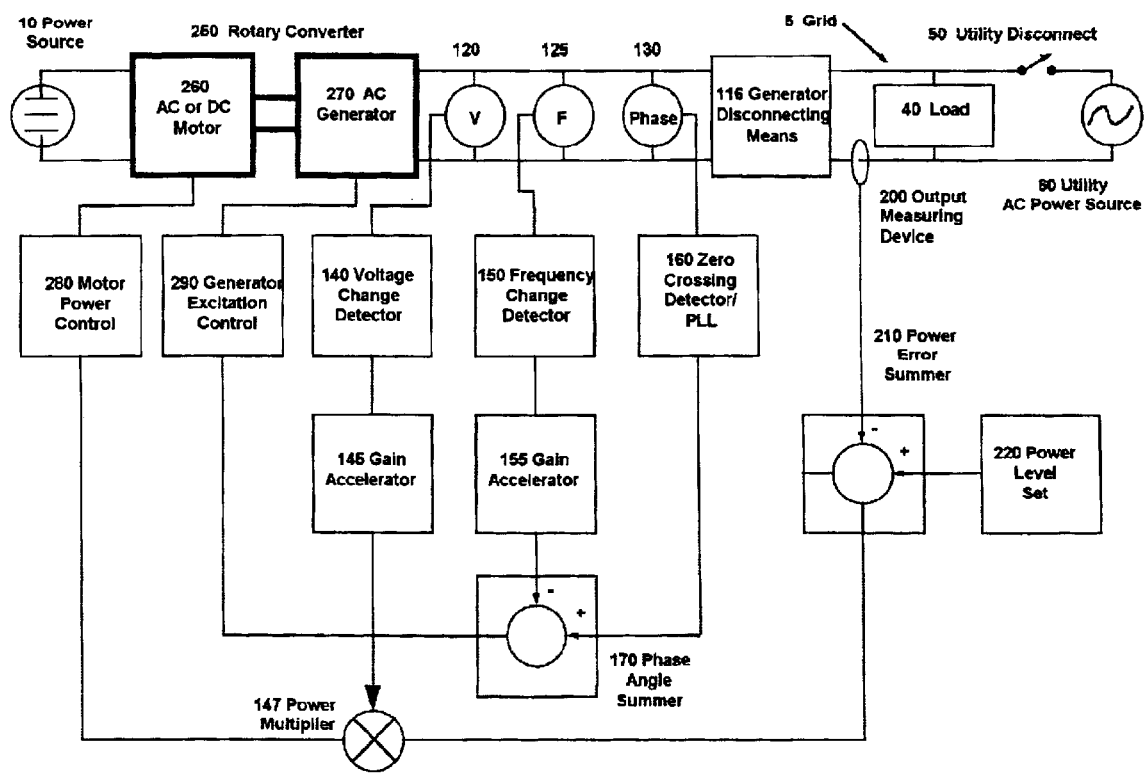
FIG. 4 is a block diagram showing an embodiment with a rotary converter.

FIG. 4 is another embodiment of the present invention, wherein a rotary converter substitutes for the converter. The rotary converter consists of an AC or DC motor 260 coupled to an AC generator 270 and controlled by a motor power control 280 and generator excitation control 290. Other components, such as the change detectors 140, 150 and gain accelerators 145, 155 have the same functions as described herein.

As the motor power control 280 controls converter power output and as the generator excitation control 290 controls generator voltage and hence reactive power, this embodiment works in exactly the same fashion as the converter embodiment shown in FIG. 3. The two feedback loops—an observed change in voltage causing a change in power and an observed change in frequency causing a change in reactive power—together with accelerating response—constitute a reliable non-islanding protection method.

Figure 5:
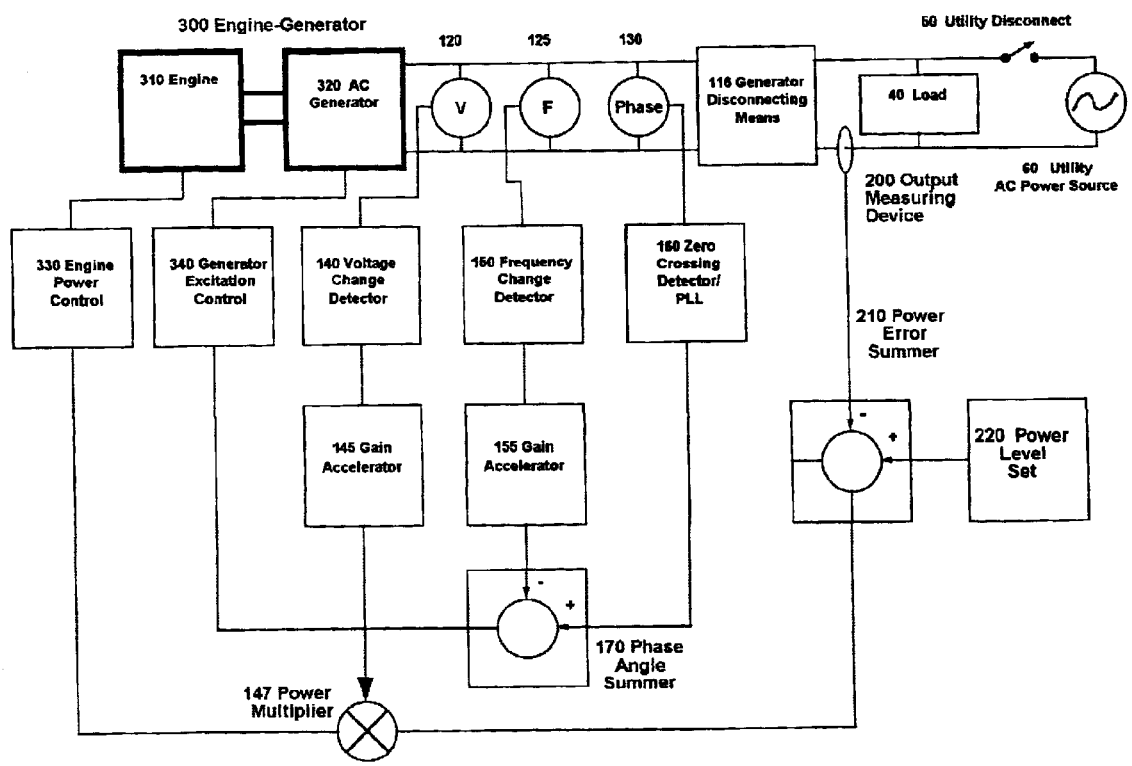
FIG. 5 is a block diagram showing an embodiment with an engine-generator set.

In FIG. 5, a further embodiment of the invention substitutes an engine generator set for the rotary converter 250 in FIG. 4. The engine generator set 300 consists of the engine 310 (for example a diesel or spark-ignition engine) coupled to an AC generator 320 and controlled by an engine power controller 330 and generator excitation control 340. Other components, such as the change detectors 140, 150 and gain accelerators 145, 155 have the same functions as described herein.

As the engine power control 330 controls engine 310 power output and as the generator excitation control 340 controls generator 320 voltage and hence reactive power, this embodiment works in exactly the same fashion as the converter embodiment shown in FIG. 3. The two feedback loops—an observed change in voltage causing a change in power and an observed change in frequency causing a change in reactive power—together with accelerating response, constitute a reliable non-islanding protection method.

The foregoing description of the preferred embodiment of the invention has been presented for the purpose of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

The invention is susceptible of many variations, all within the scope of the claims. The preferred embodiment described here and illustrated in the figures should not be construed as in any way limiting.

No warranty is expressed or implied as to the actual degree of safety, security or support of any particular specimen of the invention in whole or in part, due to differences in actual production designs, materials and use of the products of the invention.

An anti-islanding apparatus for isolating a power source from a failed electrical grid, comprising a power converter connectable between said power source and said grid; a means for measuring a voltage of said grid; a means for calculating a voltage trend in said grid voltage, using a present grid voltage measurement and a prior grid voltage measurement; a means for calculating a positive feedback power converter control signal based on said voltage trend;

a control circuit connected to said power converter, wherein said control circuit applies said control signal to said power converter; and a means of disconnecting said power source from said grid when said present grid voltage is outside pre-defined limits.

An anti-islanding apparatus, wherein said control signal comprises an acceleration function. An anti-islanding apparatus further comprising a means for measuring a frequency of said grid; a means for calculating a frequency trend in said grid frequency using a present grid frequency measurements and a prior grid frequency measurement; a means for calculating said positive feedback power converter control signal based on said frequency trend; and a means of disconnecting said power source from said grid when said present grid frequency is outside pre-defined limits.

An anti-islanding apparatus wherein said control signal comprises an acceleration function. An anti-islanding apparatus wherein when said power source is operating in a power limited condition, said control signal commands a lower power output in all cases. An anti-islanding apparatus, wherein said means for measuring operates continuously.

An anti-islanding apparatus, wherein said means for measuring operates at intermittent intervals. An anti-islanding apparatus for isolating a power source from a failed electrical grid, comprising: a power converter connectable between said power source and said grid; a means for measuring a frequency of said grid; a means for calculating a frequency trend in said grid frequency using a present grid frequency measurements and a prior grid frequency measurement; a means for calculating a positive feedback power converter control signal based on said frequency trend; a control circuit connected to said power converter, wherein said control circuit applies said control signal to said power converter; and a means of disconnecting said apparatus from said grid when said present grid frequency is outside pre-defined limits. An anti-islanding apparatus wherein a grid phase is calculated from said grid frequency. An anti-islanding apparatus wherein said means of measuring operates continuously.

An anti-islanding apparatus wherein said means of measuring operates at intermittent intervals. A method of preventing islanding of a power source on a distributed grid comprising the steps, measuring grid voltage; calculating a voltage trend in said grid voltage, using a present grid voltage measurement and a prior grid voltage measurement; calculating a power converter control signal in a same direction as said voltage trend; applying said power converter control signal to said power converter; and disconnecting said power source when said present grid voltage measurement is outside acceptable limits.

An anti-islanding apparatus, further comprising measuring grid frequency; calculating a frequency trend in said grid frequency, using a present grid frequency measurement and a prior grid frequency measurement; calculating a power converter control signal in a same direction as said frequency trend, applying said control signal to said power converter; and disconnecting said power source when said present grid frequency measurement is outside acceptable limits.

A method of preventing islanding of a power source on a distributed grid, wherein said calculation of power converter control signal uses an accelerating function.

A method of preventing islanding of a power source on a distributed grid further comprising; measuring grid phase; calculating a phase trend in said grid phase, using a present grid phase measurement and a prior grid phase measurement; calculating a power converter control signal in a same direction as said phase trend; applying said control signal to said power converter; and disconnecting said power source when said present grid frequency measurement is outside acceptable limits. A method of preventing islanding of a power source on a distributed grid wherein said steps of measuring, calculating, processing, calculating and applying are performed continuously. A method of preventing islanding of a power source on a distributed grid, wherein said steps of measuring, calculating, processing, calculating and applying are performed at intermittent intervals. A method of preventing islanding of a power source on a distributed grid wherein said acceleration function is comprised of linear, exponential, and geometric functions. A method of preventing islanding of a power source on a distributed grid wherein said power converter control signal lowers voltage in a power limited source.

A method of preventing islanding of a power source on a distributed grid comprising the steps: measuring grid frequency; calculating a frequency trend in said grid frequency, using a present grid frequency measurement and a prior grid frequency measurement; calculating a power converter control signal in a same direction as said frequency trend; applying said control signal to said power converter; and disconnecting said power source when said present grid frequency measurement is outside acceptable limits.

I claim:

1. A system for controlling power supplied to a utility network, comprising:
   a detector to detect a characteristic of power on a grid line of the utility network;
   an accelerator to provide an accelerating response function in response to a change in the characteristic; and
   circuitry to control the power supplied to the utility network based on the accelerating response function, the circuitry comprising a power converter that operates in accordance with the accelerating response function;
   wherein the circuitry controls the power supplied to the utility network so as to reduce an islanding condition of a power source relative to the utility network.

2. The system of claim 1, wherein the characteristic relates to voltage on the grid line.

3. The system of claim 2, wherein the characteristic comprises at least one of a direction and an amount of voltage change on the grid line.

4. The system of claim 1, wherein the characteristic comprises signal frequency on the grid line.

5. The system of claim 1, wherein the circuitry controls the power by changing a voltage on the grid line in a same direction as the change.

6. The system of claim 1, wherein:
   the detector comprises a voltage detector to detect voltage on the grid line; and
   the system further comprises a frequency detector to detect a frequency of the voltage on the grid line, the circuitry controlling the power supplied to the utility network based on outputs of both the frequency detector and the voltage detector.

7. The system of claim 6, further comprising a phase detector to detect a phase of the voltage on the grid line, the circuitry controlling the power supplied to the utility network based also on an output of the phase detector.

8. The system of claim 7, wherein the circuitry comprises a zero crossing detector which detects a loss of power in the utility network based on an output of the phase detector.

9. The system of claim 1, further comprising the power source to supply the power to the utility network.

10. A method of controlling power supplied to a utility network, comprising;

detecting a trend in voltage on the utility network;

providing an accelerating response function in response to the trend; and controlling a power converter, which supplies the power to the utility network, in accordance with the accelerating response function;

wherein controlling comprises controlling the power converter to supply power to the utility network so as to reduce an islanding condition of a power source relative to the utility network.

11. The method of claim 10, wherein the trend comprises a change in voltage on the utility network.

12. The method of claim 11, wherein controlling comprises changing a supply of voltage to the utility network in a same direction as the change in voltage on the utility network.

13. The method of claim 11, wherein the change in voltage comprises at least one of a change in voltage level and a change in voltage frequency.

14. The method of claim 10, wherein the accelerator operates in accordance with the trend.

15. An apparatus for controlling power supplied to a utility network, comprising:

circuitry to detect a trend in voltage on the utility network;

an accelerator that provides an accelerating response function in response to the trend; and circuitry to control a power converter, which supplies the power to the utility network, in accordance with the accelerating response functions;

wherein the circuitry to control the cower converter controls the power converter to supply power to the utility network so as to reduce an islanding condition of a power source relative to the utility network.

16. The apparatus of claim 15, wherein the trend comprises a change in voltage on the utility network.

17. The apparatus of claim 16, wherein the circuitry to control the power converter comprises circuitry to change a supply of voltage to the utility network in a same direction as the change in voltage on the utility network.

18. The apparatus of claim 16, wherein the change in voltage comprises at least one of a change in voltage level and a change in voltage frequency.

19. The apparatus of claim 15, further comprising the power source.

20. The apparatus of claim 15, wherein the accelerator operates in accordance with the trend.

21. A system for controlling power supplied to a utility network, comprising:

a detector to detect a characteristic of power on a grid line of the utility network and to measure a change in the characteristic, the detector comprising a voltage detector to detect voltage on the grid line;

circuitry to control the power supplied to the utility network based on the change in the characteristic;

a frequency detector to detect a frequency of the voltage on the grid line, the circuitry controlling the power supplied to the utility network based on outputs of both the frequency detector and the voltage detector; and a phase detector to detect a phase of the voltage on the grid line, the circuitry controlling the power supplied to the utility network based also on an output of the phase detector.

22. The system of claim 21, wherein the circuitry comprises a zero crossing detector which detects a loss of power in the utility network based on an output of the phase detector.

23. A system for controlling power supplied to a utility network, comprising:

a detector to detect a characteristic of power on a grid line of the utility network, and to measure a change in the characteristic;

circuitry to control the power supplied to the utility network based on the change in the characteristic; and a phase detector to detect a phase of the voltage on the grid line, the circuitry controlling the power supplied to the utility network based also on an output of the phase detector.

24. The system of claim 23, wherein the circuitry comprises a zero crossing detector which detects a loss of power in the utility network based on an output of the phase detector.

25. A system for controlling power supplied to a utility network, comprising:

a detector to detect a characteristic of power on a grid line of the utility network;

an accelerator to provide an accelerating response function in response to change in the characteristic; and circuitry to control the power supplied to the utility network based on the accelerating response function, the circuitry comprising a power converter that operates in accordance with the accelerating response function;

wherein the characteristic comprises at least one of a direction and an amount of voltage change on the grid line.

26. The system of claim 25, wherein the circuitry controls the power by changing the voltage on the grid line in a same direction as the change.

27. The system of claim 25, wherein:

the detector comprises a voltage detector to detect voltage on the grid line; and the system further comprises a frequency detector to detect a frequency of the voltage on the grid line, the circuitry controlling the power supplied to the utility network based on outputs of both the frequency detector and the voltage detector.

28. The system of claim 27, further comprising a phase detector to detect a phase of the voltage on the grid line, the circuitry controlling the power supplied to the utility network based also on an output of the phase detector.

29. The system of claim 28, wherein the circuitry comprises a zero crossing detector which detects a loss of power in the utility network based on an output of the phase detector.

30. The system of claim 25, further comprising a power source to supply the power to the utility network.

* * * * *